INVENTORS
MILTON COHEN
JOHN P. MALRIAT

BY Arthur L. Collins
ATTORNEY

United States Patent Office 3,570,307
Patented Mar. 16, 1971

3,570,307
TENSIOMETER
Milton Cohen, Upper Darby, Pa., and John P. Malriat, Pennsauken, N.J., assignors to the United States of America as represented by the Secretary of the Navy
Filed May 29, 1969, Ser. No. 828,901
Int. Cl. G01l 5/06
U.S. Cl. 73—144     6 Claims

ABSTRACT OF THE DISCLOSURE

A novel and improved device for measuring the tension in a rope or cable constructed of nylon and/or various other similar materials. The device includes a pair of longitudinally spaced hinged bands by which the device is removably applied to the cable to be tested and an element which engages the cable between the longitudinally spaced bands and applies a transverse force on a multiple leaf spring. Flexure of the spring along a calibrated scale indicates the degree of tension on the cable.

---

The invention described herein may be manufactured and used by or for the Government of the United States of America for governmental purposes without the payment of any royalties thereon or therefor.

Various types of dynamometers have been used in the past to measure tension in an elongated rope or cable. Dynamometers used heretofore are generally placed in series with the cable system usually between one end of the cable to be tested and its adjacent anchoring point. Tension on the cable while the dynamometer is inserted in or removed from the system must be maintained in some suitable manner. Considerable difficulty has been experienced heretofore, however, in maintaining cable tension when the tensiometer is inserted and removed from the system particularly when a high accuracy measurement is required.

It is therefore a principal object of the invention to provide a novel and improved device for measuring tension in a rope or cable which is convenient to use and which provides results that are accurate and reliable.

It is a further object of the invention to provide a novel and improved tensiometer which measures tension in a rope or cable accurately without inserting the tensiometer in series in the cable system.

Other objects and many of the attendant advantages of this invention will be readily appreciated as the same becomes better understood by reference to the following detailed description when considered in connection with the accompanying drawing wherein.

Figure 1:
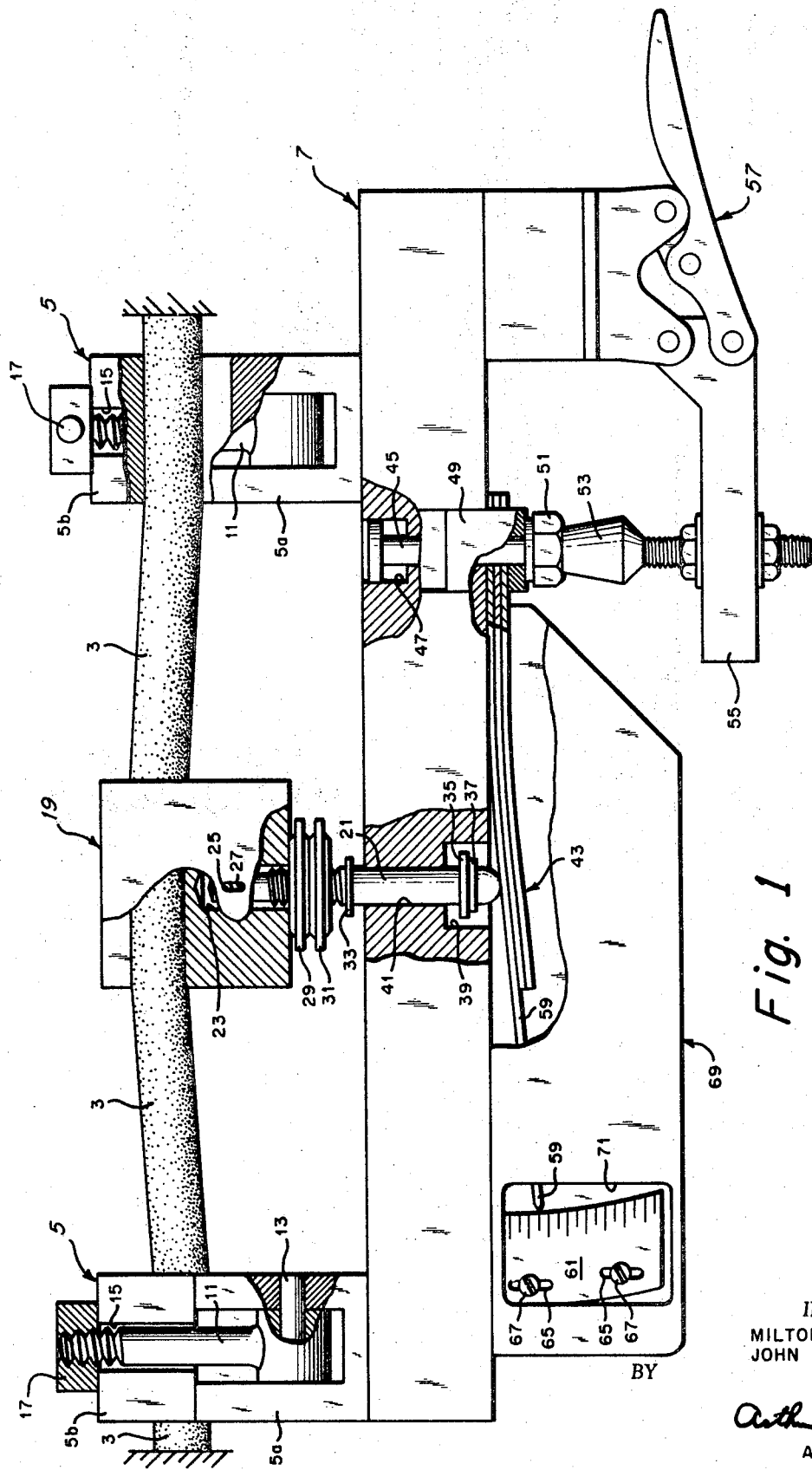
FIG. 1 is a side elevational view partially in section of a preferred embodiment of the present invention.
Figure 2:
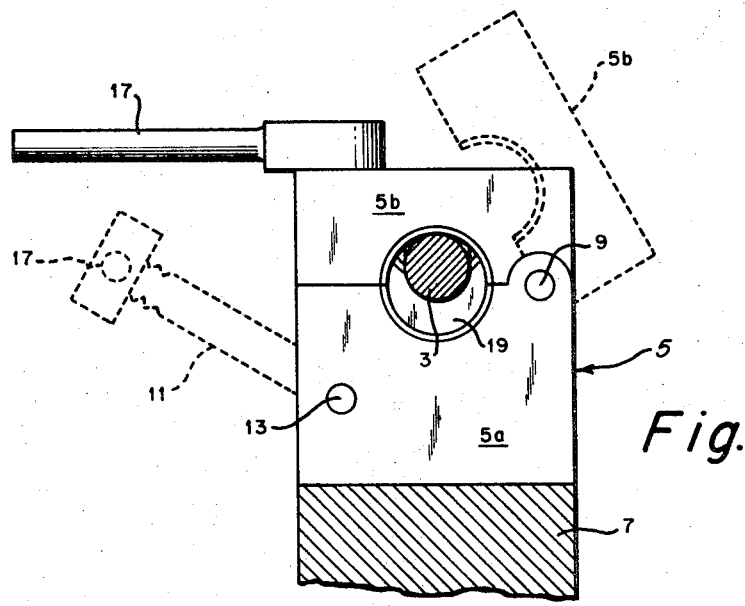
FIG. 2 is an end view of the embodiment of the invention shown in FIG. 1.
Figure 3:
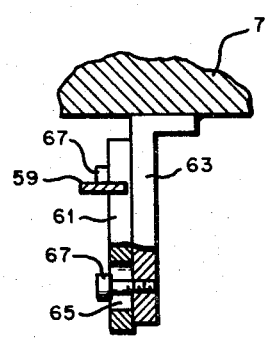
FIG. 3 is a detail view which shows how the indicator scale member is secured to the base member in FIG. 1 of the drawing.

Referring now to the various figures of the dawing, it will be noted that the rope or cable 3, the tension of which is to be measured, extends through the longitudinally spaced cable encircling bands or the like 5. Each band 5 includes a lower half portion 5a which is secured to and extends upwardly from the upper surface of the base member 7 of the tensiometer and an upper half portion 5b which is pivotably connected to its associated lower half portion by a pin 9. The locking bolt 11 is pivotably journaled by means of the pin 13 in a cutaway portion of the lower half of each band 5. When the band 5 occupies its rope engaging closed condition, the bolt 11 extends upwardly along the slot 15 in the front edge of the upper half portion of each band 5 and threadedly engages the end of lever 17. When the lever 17 is threaded down on bolt 11, contiguous halves of each band 5 are clamped together and the tensiometer is secured on the rope or cable 3.

The U-shaped element 19 which engages the lower peripheral surface of the cable 3 approximately medially between the cable engaging bands 5 is adjustably mounted on the end of the support rod or guide member 21. More specifically, the guide member 21 extends upwardly into the aperture 23 in the bottom of element 19. The pin 25, which is integrally secured to guide member 21, extends radially outwardly from the guide member through the vertical slot 27 in the lower portion of element 19. The element positioning nut 29 and its locking nut 31 threadedly engage the outer peripheral surface of guide member 21 and adjustably limit downward movement of the pin 25 in the slot of element 19. The retainer ring 33 which is also integrally secured to guide member 21 permits the lower end of the guide member to extend a predetermined distance below the bottom surface of the base member 7. The enlarged retainer ring 35 and nut 37 on the lower end of guide member 21 limits upward movement of the guide member into the countersunk portion 39 of aperture 41 in base member 7.

The multiple leaf spring 43, that extends along the bottom of base member 7 over the countersunk aperture 41, is releasably secured at one end to the base member. More specifically, the bolt 45 extends downwardly from the countersunk aperture 47 in the upper surface of base member 7 through an aperture in the spring 43, through the U-shaped leaf spring guide 49 into the self-locking nut 51 threaded on the end thereof. The sides of the upwardly directed open end of the U-shaped spring guide 49 slide vertically in grooves in opposite side edges of the base member 7. Thus, the multiple leaf spring 43 slides upwardly and downwardly on bolt 45 until, with upward movement of bolt 45, spring 43 is clamped by the nut 51 between the bottom of base member 7 and the inner surface of the spring guide 49.

The mechanism for moving the bolt 45 upwardly into its leaf spring clamping position includes the bolt striker element 53 which is adjustably secured to the end of the bell crank lever 55. The bell crank lever 55 is pivotably secured to the bottom of base member 7 and is actuated by the conventional toggle mechanism 57.

The free end of one of the multiple leaves of spring 43 extends beyond the ends of the other leaves and as will be more apparent hereinafter, provides a suitable indicator arm or pointer 59 for measurement of tension on the cable 3. The indicator scale member 61 is secured to the bottom of base member 7 by the L-shaped bracket 63 so as to be positioned in a plane juxtaposed to the plane of movement of the extended leaf spring or indicator arm 59 when the spring 43 is actuated by the guide member 21. As will be more apparent hereinafter, the vertical slots 65 in the indicator scale member 61, through which the machine screws 67 that secure the member 61 to the bracket 63 extend, allow vertical adjustment of the disposition of the member 61 for a zero adjustment of the tensiometer. The cover 69, which encloses the spring 43 and the indicator scale member 61, is secured to the bottom of the base member 7 in any suitable manner. The cover 69 includes the enlarged rectangular aperture 71 through which the position of the spring pointer 59 on the scale may be readily observed.

In operation, when tension on the cable 3 is to be determined, the tensiometer is positioned on the cable between the upper and lower halves of the hinged bands 5 and locking bolts 11 are secured to maintain the bands 5 in their closed condition about the cable. The toggle mechanism 57 is then operated so as to disengage the bolt 45. The spring 43 then drops downwardly away from the base member 7 and allows the guide member 21 to assume its lowermost position in the aperture 41 in the base member 7 where its integral retainer ring 33 rests on the upper surface of the base member. The positioning and locking nuts 29 and 31 on guide member 21 are then operated so as to move the element 19 upwardly until it just engages the bottom of the cable 3. The toggle mechanism 57 is then operated to its spring clamping position. The spring 43 then engages the bottom of guide member 21 and urges the guide member upwardly against the cable 3. Resistance to upward movement of guide member 21 depends on the tension on cable 3. The spring 43 is therefore bent downwardly an amount proportional to the tension on the cable. The indicator scale 61 is calibrated to provide a direct reading of the cable tension. Vertical movement of the indicator scale member 61 in its slots 65 on bracket 63 provides a suitable zero adjustment for the tensiometer. Removal and/or reapplication of the tensiometer on the cable 3 or another cable is readily accomplished by operation of locking bolts 11 and by opening or closing the hinged bands 5. It will be noted that the apertures in the contiguous halves of bands 5 are sufficiently large to accommodate a plurality of different sized cables. Vertical adjustment of the position of the U-shaped cable engaging element 19 on the upper end of guide member 21 assures accurate readings of tension when the tensiometer is to be applied to cables of varying diameter.

Obviously, many modifications and variations of the present invention are possible in the light of the above teachings. It is therefore to be understood that within the scope of the appended claims, the invention may be practiced otherwise than as specifically described.

What is claimed is:

1. Apparatus for measuring the tension in a flexible cable, said apparatus comprising:
   (a) a base member;
   (b) a pair of longitudinally spaced hinged bands which extend upwardly from the base member and which, when closed, are adapted to encircle the cable and engage its upper peripheral surface;
   (c) a U-shaped element which engages the lower peripheral surface of the cable between the hinged bands and which includes a supporting guide member that extends downwardly through an aperture in the base for vertical slideable movement therein;
   (d) a leaf spring releasably secured at one end to the bottom of the base, said spring extending across the aperture in the base so as to be engaged by the support guide member when it extends therethrough;
   (e) and an indicator scale secured to the bottom of the base along which the other end of the spring moves to register tension in the cable when the U-shaped element and its support guide member are directed downwardly by the cable against the spring.

2. The apparatus substantially as described in claim 1 and further including means for locking the hinged bands in their closed condition around the cable.

3. The apparatus substantially as described in claim 1 wherein the hanged bands are large enough in diameter to accommodate a plurality of different cable sizes.

4. The apparatus substantially as described in claim 1 and further including means for adjustably controlling the effective length of the guide member that extends downwardly from the U-shaped cable engaging element.

5. The apparatus substantially as described in claim 1 and further including means for adjusting vertical disposition of the indicator scale on the base member.

6. The apparatus substantially as described in claim 1 wherein the means for releasably securing one end of the leaf spring to the bottom of the base member includes a toggle clamping mechanism.

References Cited

UNITED STATES PATENTS

| | | | |
|---|---|---|---|
| 1,657,261 | 1/1928 | Iler | 73—144 |
| 1,722,036 | 7/1929 | Byl | 73—144 |
| 1,771,339 | 7/1930 | Martin | 73—144 |
| 2,285,471 | 6/1942 | Sturgess | 73—144 |
| 2,592,868 | 4/1952 | Cushman | 73—144 |

FOREIGN PATENTS

| | | | |
|---|---|---|---|
| 130,658 | 8/1919 | Great Britain | 73—144 |

CHARLES A. RUEHL, Primary Examiner